United States Patent [19]

Sattler et al.

[11] Patent Number: 5,846,317
[45] Date of Patent: Dec. 8, 1998

[54] METHOD OF CONTROLLING THE HYDRATION BEHAVIOR OF GYPSUM IN THE MANUFACTURE OF COMPOSITE MATERIALS

[75] Inventors: Heinz Sattler; Volker Thole, both of Braunschweig; Bernhard Schmelmer, Kleinwallstadt, all of Germany

[73] Assignee: Fraunhofer-Gesellschaft zur Forderung der Angewandten Forschung e.v., Munich, Germany

[21] Appl. No.: 569,239

[22] PCT Filed: Jun. 23, 1994

[86] PCT No.: PCT/DE94/00718

§ 371 Date: Mar. 20, 1996

§ 102(e) Date: Mar. 20, 1996

[87] PCT Pub. No.: WO95/01942

PCT Pub. Date: Jan. 19, 1995

[30] Foreign Application Priority Data

Jul. 10, 1993 [DE] Germany ............... 43 23 116.0

[51] Int. Cl.⁶ .................................. C04B 11/00
[52] U.S. Cl. ............. 106/778; 106/711; 106/781; 106/783; 106/785; 156/34; 264/333
[58] Field of Search .................. 106/711, 778, 106/781, 783, 785; 156/39; 264/333

[56] References Cited

U.S. PATENT DOCUMENTS

| | | | |
|---|---|---|---|
| 1,630,579 | 5/1927 | Payne | 264/333 |
| 2,239,861 | 4/1941 | Roos et al. | 156/40 |
| 2,966,473 | 12/1960 | Biefeld et al. | 524/423 |
| 3,671,280 | 6/1972 | Smith | 524/5 |
| 3,748,290 | 7/1973 | Reingen et al. | 521/100 |
| 4,784,816 | 11/1988 | Sattler | 264/210.2 |
| 5,116,555 | 5/1992 | Thole et al. | 264/40.5 |

FOREIGN PATENT DOCUMENTS

| | | |
|---|---|---|
| 126848 | 12/1984 | European Pat. Off. . |
| 0171665 | 7/1985 | European Pat. Off. . |
| 0429820 | 10/1990 | European Pat. Off. . |
| 0561270 | 3/1993 | European Pat. Off. . |
| 3307927 | 9/1984 | Germany . |
| 3642802 | 6/1988 | Germany . |
| 3929703 | 3/1991 | Germany . |
| 4031935 | 6/1992 | Germany . |
| 4239033 | 9/1993 | Germany . |

OTHER PUBLICATIONS

Exhibit 1, Technical and Chemical Data (in the German language, with a copy of the English translation). No Date.
Exhibit 2, Wood Lexicon, "Reference Work for the Wood and Forestry Industry" (in the German language, with copy of the English translation). No Date.

*Primary Examiner*—Anthony Green
*Attorney, Agent, or Firm*—Weingarten, Schurgin, Gagnebin & Hayes LLP

[57] ABSTRACT

A method of controlling the ratio of hydration time (HT) to open time (OT) in the manufacture of composite materials from a mixture containing hydratable calcium sulphate such as gypsum binders, aggregates, fibers, water additives and other additives is disclosed. The method includes adding a retarder-accelerator combination such as Retardan and potassium sulphate to the mixture and applying pressure. The retarder-accelerator combination and application of pressure provide advantageous reduction in the ratio HT:OT. More particularly, HT:OT can be reduced to less than 1.

9 Claims, 2 Drawing Sheets

METHOD OF CONTROLLING THE HYDRATION BEHAVIOR OF GYPSUM IN THE MANUFACTURE OF COMPOSITE MATERIALS

Described is a method of controlling the hydration behaviour of gypsum in the manufacture of composite materials, in particular board.

Gypsum-bound composite materials are increasingly produced according to the semi-dry method. The semi-dry method is a process in which the aggregates (e.g. chips or fibres) are mixed with the gypsum binder into a loose mixture. This mixture is spread to form a low-density fleece by means of automatic spreading equipment. Then, pressure is applied to compact the fleece so that the result after hydration is a more or less compact and solid board depending on the composition of the mixture and the amount of pressure applied. The different variations of the semi-dry method all share the same disadvantage: The short open time (OT) of commercial gypsum binders used in discontinuous systems is not sufficient to perform all operations (i.e. dosing, mixing, spreading, precompacting) properly before the beginning of hydration (BH) (see FIG. 1, curve 1). Therefore, retarders are added to the mixtures to be processed. However, this causes an undesirable side effect, i.e. the end of the hydration process (EH) is delayed (see FIG. 1, curve 2). This means that even longer compacting times are required, which has a marked negative impact on both continuous and discontinuous manufacturing. In those cases where a practicable solution has been found, the compacting presses required in the production plants are a considerable cost factor in the production process.

Several methods have already been proposed to avoid these disadvantages. DE-OS 37 10 907.3 describes such a method: It is proposed to add a retarder to the mixture that delays the hydration of the gypsum until a 1 m high stack of boards has accumulated for batch-processing in a compacting press of appropriate dimensions. A heavy clamping device is used to hold the stack of boards to ensure that the entire stack can be removed from the press to avoid that the press is blocked by the stack during the entire duration of the prolonged hydration process. This device is closed and locked as soon as the compaction process begins. After the compaction process, the stack is removed from the press together with the clamping device and left to harden outside the press. However, this compaction method requires an expensive special press and a sufficiently large number of clamping devices depending on the desired plant capacity. Additionally, boards pressed in stacks are marked by significant thickness tolerances, which means that a separate grinding process is usually required to calibrate the boards. This complicated and expensive method is described in detail by E. Frick (in *Zement-Kalk-Gips,* issue no. 7/1988).

Another method that can also be used for the continuous production of gypsum-bound composite materials is described in EP 171665 B2. The method of short-term overcompaction disclosed under this patent recommends a simplified continuous compaction system. However, this method has not been widely accepted in practice due to the long hydration times and the required long calibration unit. An additional disadvantage is that the method cannot be used for the production of highly resistant composite materials compacted to the point of incompressibility.

A method to reduce the hydration time without reducing the open time (OT) by adding activating energy during the hydration time (HT) is described in DE OS 36 42802. The activating energy can be thermal energy, electrical energy or electromechanical energy. Due to the very nature of the gypsum hydration process, it is not possible to accelerate the process by adding thermal energy. The result will rather be a delay, because the solubility of the semihydrate decreases as the temperature increases, and the dihydrate formation mechanism takes place via the dissolution phase. The addition of the entire quantity of mixing water and an accelerator contained in capsules is described in DE OS 40 31 935, while DE OS 39 29 703 describes a method to add the accelerator in the shape of ice granules. These two methods ensure that the open time (OT) can be perfectly adjusted to the production process because a dry mixture of gypsum binder, aggregate and capsules or ice granules, respectively, is spread and shaped and that the beginning of the hydration process can be started at precisely the desired moment through the destruction of the capsules or the melting of the ice granules, which means that the effect of the accelerator can be precisely timed. However, these methods are technically demanding, energy-consuming and, therefore, expensive. The accelerators are distributed exclusively via capillarity and diffusion, which means that the accelerating effect can never take place immediately so that a delay must always be taken into account.

The addition of a retarder-accelerator combination to regulate the gypsum hydration process is mentioned in "*Der Baustoff Gips*" (Verlag für Bauwesen, 1978, p. 26). The description states that such a combination delays the beginning of the hardening process and then accelerates the hydration process (see FIG. 1, curve 3). Karger (*Baustoffindustrie* 1988/6/Nov., p. 168) describes this process as reducing the time interval between the beginning of the hardening process and the end of both the hardening and hydration process without considerably anticipating the beginning of the hardening process. The hydration time can be reduced by adding a certain retarder-accelerator combination from HT/OT=1.5 to HT/OT=1. However, for economical production in continuous production systems this relatively large ratio is still a disadvantage.

Another method for the production of gypsum-bound shaped elements containing lignocellulose is described in DE OS 40 31 935. This method consists of the following steps:

1. Dry mixing of fibres and gypsum binder.
2. Subsequent continuation of the mixing process with the addition of water with lignin sulfonic acid.
3. Then, a mixture of a latent gypsum binder accelerator and finely ground waste material from edge trimming and/or sanding dust of the shaped elements described in the invention is added shortly before the material is spread into shape.
4. Finally, the wet homogeneous mass is spread and compacted until the gypsum has hardened.

The disadvantage of this method is the large number of individual worksteps and the complicated technical process required to add the accelerating mixture shortly before the spreading process.

The intention of the invention disclosed in the present document consists of proposing a method that avoids the disadvantages mentioned above and offers an opportunity to achieve a maximum reduction of the hydration time (HT) relevant for the production process in relation to the open time (OT) while at the same time reducing the number of worksteps to a minimum.

The present invention relates to a method for fabricating a composite material, such as a composite board, from a loose mixture containing hydratable calcium sulfate with a characteristic open time (OT), aggregates, fibres, water additives and other additives, the method including the steps of:

adding a retarder-accelerator combination to the mixture;

applying pressure to the mixture; and hydrating the mixture during a hydration time (HT) starting at a beginning of hydration (BH) and ending at an end of hydration (EH) such that a ratio HT:OT is thereby calculable and is below 1.

The invention further relates to a method as above where the hydrating step includes reducing HT:OT below 0.5. In a preferred embodiment, the retarder-accelerator combination includes a calcium salt of an N-polyoxymethylene amino acid, such as the commercial plaster hardening retardant made and sold by Tricosal, D-89257 Hertissen, Germany, under the name RETARDAN, especially RETARDAN P, and potassium sulfate. Advantageously the amount of Retardan added is about 0.01–0.10% of the amount of calcium sulfate present, and the amount of potassium sulfate is about 0.25–2.50% of the amount of calcium sulfate present.

In one embodiment of the invention, the retarder-accelerator is evenly mixed with the mixing water before the beginning of the actual process of mixing of the ingredients of the loose mixture.

In another embodiment of the invention, pressure is applied starting at the beginning of hydration (BH) and maintained during the entire hydration time (HT) to compact the formed element. In an alternate embodiment, pressure is applied before hydration begins in the uncompacted material, and is maintained during the entire hydration time, to compact the formed element.

In the case of the invented process it was found, surprisingly, that the ratio of hydration time (HT) to open time (OT) of usually more than 1.5, important to the production of gypsum composite materials, can be reduced to values of less than 1 by the addition of a retarder-accelerator combination in conjunction with the application of pressure. The invented process thus makes it possible, with a simple and cost-effective execution variant, to minimize the side effects of the use of retarders and thus to achieve shorter pressing times. With the use of a pressure corresponding to the compacted-structure state, the ratio of hydration time (HT) to open time (OT) can be reduced to values of even less than 0.5 (FIG. 1, Curve 4). Furthermore, the process provides the prerequisites for the combination of a process running in part continuously (mixing and spreading) with a discontinuous compacting process in such a way that the-production of highly compacted gypsum composite materials of high strength can be achieved on an industrial scale.

An advantageous development of the invention provides for the use of already commercially available retarders and accelerators in concentrations which correspond to the effect with separate application as retarders or accelerators, and for the retarder-accelerator combination of the same to be uniformly distributed prior to the actual mixing process in the water of plasticity. It was surprisingly found, namely, that it is sufficient for the quantitative ratio of the retarder to accelerator to lie within a certain range, and that the time-consuming determination of a precise mixing ratio is thus no longer necessary.

Moreover, it is particularly advantageous for the effect of pressure—when process-technically necessary—to take place at the latest with the beginning of hydration (BH) occurring in the unpressurized state and to be maintained during the shortened hydration time, or for the beginning of hydration (BH) to be moved forward in time by an application of pressure earlier than that corresponding to the beginning of hydration in the unpressurized state and for the application of pressure to be maintained during the likewise shortened hydration time.

It is favorable to produce composite materials of lesser density than that corresponding to the compacted-structure state, for the advantageous shortening of the hydration time (HT) or pressing time to take place by means of short-term excess compression followed by decompression at the beginning of the hydration phase. The following examples and drawings serve for the explanation of the invention:

EXAMPLE 1

A special gypsum fibre board was produced using a procedure described in P 42 39 033.8-25 in a continuous production process with a production capacity (mixing and spreading) continuously adjustable between 0.75 m$^2$/min and 3 m$^2$/min. The target production figure was 1 m$^2$ of board per minute, which means that the required minimum press length (Ip) depended only on the hydration time (HT). The gypsum used for board production was commercial plaster of Paris as described in DIN 1168 with an open time (OT) of 10 minutes (i.e. beginning of the hardening process).

Figure 1:
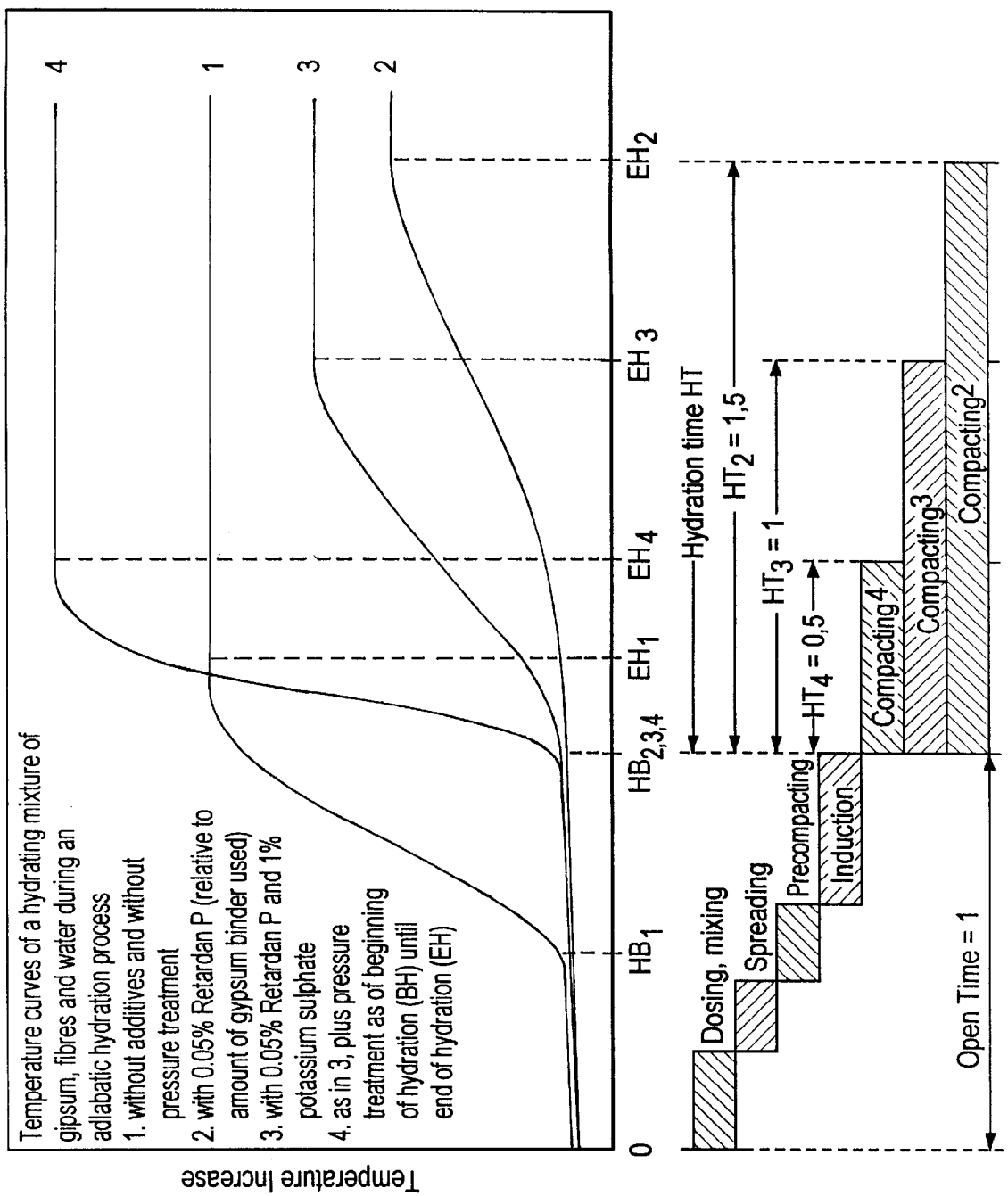
In FIG. 1 temperature curves of a hydrating gypsum-fiber-water mixture are shown with an adiabatic hydration pattern.
Figure 2:
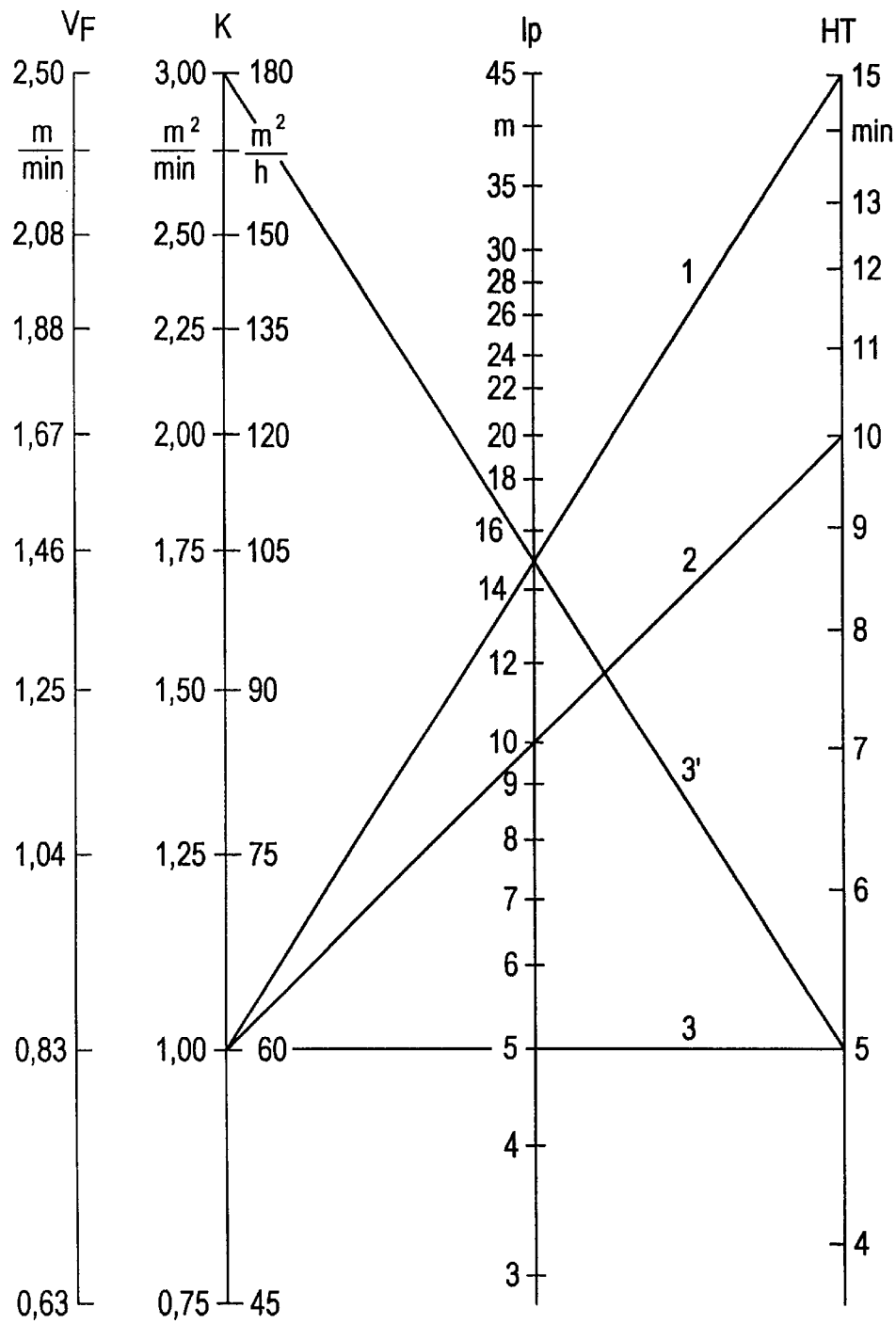
In FIG. 2 a nomogram is shown for the determination of the minimal press length for continuous gypsum-board production as a function of the hydration time of the gypsum and of production capacity.

Hydration ended after 25 minutes, which means that the hydration time (HT) was 15 minutes. The minimum press length is 15 m (see FIG. 2, solution 1).

The addition of a retarder-accelerator combination consisting of 0.05% RETARDAN P a calcium salt of an N-polyoxymethylene amino acid, a commercial plaster hardening retardant made by Tricosal, D-89257 Hertissen, Germany, and 1% potassium sulphate (relative to the amount of gypsum binder used) and the application of pressure according to the invention shortened the hydration time (HT) to 5 minutes while the open time (OT) remained the same (10 min). This means that the required press length for the same production capacity was only 5 m (see FIG. 2, solution 3). At the original press length, i.e. 15 m, this means that the production capacity of the facility can be tripled by application of the invention (see FIG. 2, solution 3').

EXAMPLE 2

A facility (production width 1.25 m) with a mixing and spreading capacity adjustable within certain limits and a usable press length of 4.25 m was used to produce a composite material. Plaster of Paris (100%) as specified in DIN 1168 was mixed with 12.5% cellulose fibres and 25% water containing 0.04% RETARDAN P. This mixture was spread to form a fleece. The addition of RETARDAN was required to delay the beginning of hydration from 7 minutes to 15 minutes. Consequently, the hydration time (pressing time) was 24 minutes. The facility produces 76,500 m$^2$ of board in three-shift operation (240 working days per year).

EXAMPLE 3

The same equipment and the same mixture were used. However, a retarder-accelerator combination of 0.05% RETARDAN P and 1% potassium sulfate was used according to the invention. This was combined with compaction to structural density at the beginning of hydration. The hydration time (pressing time) was reduced to 7 minutes, and board production could be increased to 262,300 m$^2$ per year.

EXAMPLE 4

A gypsum binder (β-semihydrate) was mixed with 15% fibres and additives (0.05% RETARDAN P; 1% potassium sulfate) dissolved in the mixing water (25%) into a homogeneous mass. This mass was spread and precompacted to approximately $2 \times d_{soll}$. The rise of the temperature-time curve (beginning of hydration), i.e. 16 minutes after the beginning of the mixing phase, marks the time when the fleece was compacted to $d_{soll}$. The maximum temperature (EH) was reached after 6 more minutes and the press could be opened. Without compacting, the hydration time is 13 minutes.

EXAMPLE 5

A fresh mass was mixed containing the same components as in example 3. However, the quantity of Retardan was increased to 0.08%. The fleece of fresh mass was compacted in a press 31.5 minutes after the addition of the mixing water. The temperature-time curve showed a significant temperature increase (beginning of hydration) after another 1.5 minutes, i.e. 33 minutes after the addition of water. The hydration time was 9 minutes, which corresponds to a total hydration period (BH+EH) of 42 minutes. Without compacting, the hydration begins after 43 minutes and the hydration time is 32 minutes (total hydration period: 65 minutes).

EXAMPLE 6

The fresh mass was mixed without addition of an accelerator (potassium sulfate). The production conditions were the same as described in example 4. However, the beginning of hydration was registered after 40 minutes and the hydration time was 47 minutes for compacted fleece. Without compacting, the hydration time is 234 minutes.

We claim:

1. A method for fabricating a gypsum composite material from a loose mixture comprising hydratable calcium sulfate having a characteristic open time (OT), aggregates, fibres, and water, said method comprising the steps of:

adding a retarder-accelerator combination to said loose mixture, said retarder and said accelerator added in an effective amount of each to achieve the same effect as when said retarder and said accelerator are applied separately;

applying pressure to the mixture; and hydrating the mixture during a hydration time (HT) starting at a beginning of hydration (BH) and ending at an end of hydration (EH), such that the ratio HT:OT is $\leq 1$.

2. The method of claim 1 wherein said ratio HT:OT is less than 0.5.

3. The method of claim 1 wherein said retarder-accelerator combination comprises a calcium salt of an N-polyoxymethylene amino acid and potassium sulfate.

4. The method of claim 3 wherein the amount of said calcium salt of an N-polyoxymethylene amino acid is about 0.01–0.10% of the amount of calcium sulfate present in said loose mixture, and the amount of potassium sulfate is about 0.25–2.50% of the amount of calcium sulfate present in said loose mixture.

5. The method of claim 1 wherein said retarder-accelerator combination is added to mixing water, then said mixing water is added to said loose mixture.

6. The method of claim 1 wherein said pressure is applied starting at the beginning of hydration (BH) and is maintained during said hydration time (HT).

7. The method of claim 1 wherein said pressure is applied starting before the beginning of hydration (BH) and is maintained during said hydration time (HT).

8. The method of claim 1 further including overcompacting the mixture.

9. The method of claim 1 wherein said composite material that is fabricated is a composite board.

* * * * *